United States Patent [19]

Peterson et al.

[11] 4,053,820
[45] Oct. 11, 1977

[54] ACTIVE FILTER

[75] Inventors: Harold A. Peterson, Madison, Wis.; Narendra Mohan, Minneapolis, Minn.

[73] Assignee: Wisconsin Alumni Research Foundation, Madison, Wis.

[21] Appl. No.: 653,307

[22] Filed: Jan. 29, 1976

[51] Int. Cl.$^2$ ............................................. H02M 1/12
[52] U.S. Cl. ........................................ 363/44; 367/3; 333/76; 363/48
[58] Field of Search ................... 307/3; 321/9; 333/76

[56] References Cited

U.S. PATENT DOCUMENTS

| 2,008,515 | 7/1935 | Plathner et al. | 321/9 R |
|---|---|---|---|
| 2,008,519 | 7/1935 | Smith | 321/9 R |
| 2,236,254 | 3/1941 | Willis | 321/9 R |
| 3,229,184 | 1/1966 | Churchill | 307/3 X |
| 3,813,593 | 5/1974 | Tice et al. | 321/9 R |

*Primary Examiner*—William M. Shoop
*Attorney, Agent, or Firm*—Howard W. Bremer

[57] ABSTRACT

An active filtration system is described which may be particularly useful for filtering undesired harmonics of the fundamental AC frequency produced by AC to DC or DC to AC conversion. The filtration system of the invention produces currents of a phase, frequency and magnitude for injection into the AC system such that the undesired harmonic currents to be filtered sum with the injected currents giving a net zero current at the undesired harmonic frequency. The system can incorporate existing passive filtration elements and provides a high-impedance parallel-filtration network to prevent the filteration system from acting as a "sink" for the ambient harmonics generated elsewhere in the AC system. Because the frequency, phase and magnitude of the injected currents are controlled, the filter of the invention remains highly effective even when these quantities and the filter component values vary.

13 Claims, 11 Drawing Figures

_Fig. 4a_

_Fig. 4b_

_Fig. 6_

_Fig. 7_

_Fig. 8_

ACTIVE FILTER

BACKGROUND OF THE INVENTION

This invention relates to filtering networks useful for electric power conversion systems where multiphase alternating current power is converted to direct current power and vice versa. Such techniques are used, for example, for direct current power transmission, which is becoming more popular because with newly developed transmission techniques, as in those using super-cooled conductors, power may be transmitted more efficiently with fewer losses. However, there is at present no widely used technology to directly produce DC power, and it is necessary to convert AC power to DC power and then back to AC power for transmission by DC techniques. AC to DC power converters generally rectify multiphase AC with a controlled rectifier bridge as in the Graetz type converter, so as to produce DC power. Such conversion techniques produce undesirable harmonic currents of frequencies which are harmonics of the fundamental or base frequency of the AC power. Because these harmonic currents contribute to losses in the power system and because some of them tend to interfere with communication equipment, it is necessary to provide filtering networks in conjunction with the conversion devices to eliminate these undesirable harmonic currents. For example, with 60 Hz-3 phase AC power converted to DC by a twelve pulse Graetz bridge type converter, problems with 11th (660 Hz) and 13th (780 Hz) harmonics are particularly acute.

DESCRIPTION OF THE PRIOR ART

Typically, to suppress or eliminate these harmonics, passive filtration networks have been used in conjunction with the AC power supply for the AC to DC converters. Because they are passive, these prior art filtering networks of necessity have their maximum effect centered about a predetermined, fixed frequency. These filters thus must have "tight" frequency specifications and the elements of the filters must also have high current ratings to handle high magnitude harmonics and cope with corresponding thermal conditions. These requirements lead to high component cost for the prior art passive filter networks.

Passive filtration as practiced in the prior art, because it is necessarily responsive to a fixed frequency, does not respond well if the fundamental is allowed to vary. For example, if the base or fundamental frequency is 60 Hz and varies ±1 Hz during power system operation, the 11th harmonic varies by ±11 Hz. Such shifts can readily detune the passive filter, giving rise to incomplete filtration of the harmonic, and the passive filter impedance in parallel with the AC system impedance may result in a resonance condition whereby the effects of the harmonic are actually increased. The passive filteration also provides a "sink" for the ambient harmonics generated elsewhere in the AC system. This results in increased KVA ratings of the passive filtration components. Moreover, the components are required to be of higher quality and thereby more expensive, in order to remain unchanged during operation.

OBJECTS OF THE INVENTION

Because of these problems, the active filtration network of this invention has been developed with the object of more efficiently filtering undesired harmonics from AC to DC power conversion systems.

Another object of the invention is to provide effective filtration of undesired harmonics even when the frequency of the fundamental is allowed to vary.

A further object of the invention includes providing a high impedance to ambient harmonics, allowing a reduction a power ratings of the filter components, allowing usage of inexpensive components, particularly capacitors, and to allow the utilization of presently existing passive filter networks.

SUMMARY OF THE INVENTION

The above and other objects and advantages may be realized by the filtering network of the present invention which provides a system of active as well as passive filtration. This network furnishes circuitry for the generation and injection of currents into the AC power supply network that are of such a magnitude, phase and frequency that the harmonic currents to be eliminated or suppressed and the injected currents substantially sum to zero. The network of the invention provides, in addition to means for producing and injecting such currents, parallel-resonant filters used in conjunction with already installed passive filters for maintaining high impedance to ambient harmonics in the system. The filtering network of the ivention is capable of generating such injected currents at a variable and controlled magnitude, frequency and phase to effectively compensate for fluctuations in base and harmonic frequency as well as shifts in magnitude and phase in the harmonic currents.

Thus the filtering network of the invention can substantially reduce the resonance of the passive filters to ambient harmonics as well as compensate for variation of the base frequency. Further, because the parallel-filters provided by the network of the invention are of a high impedance to the ambient harmonics, the power ratings of the passive filters may be reduced, offering the possibility that component cost can also be reduced. Further, because the filter network compensates for the changes in the passive component values, relatively inexpensive capacitor components can be used.

The above as well as further objects and advantages will be apparent from the following detailed description of the filtering network of the invention together with the appended drawings.

First, a circuit for providing the requisite harmonic currents will be described. The requirements for the filtering elements for reducing harmonics will be developed together with values for those elements. A system will then be shown incorporating the active and passive filtration arrangement of the invention into an AC to DC conversion system and finally, networks will be described that are capable of controlling the magnitude, phase, and frequency of the injected currents.

In order to create the currents necessary for injection into the AC phases of an AC to DC converter, it is of course necessary to provide a suitable source of such currents which is capable of phase, frequency and magnitude variation so that the undesired harmonic current may be adequately replicated. Because of the quick responses required, for example for filtration of the 11th harmonic of 660 Hz, as well as the high power ratings necessary, a converter consisting of Silicon Controlled Rectifiers (SCR) or similar thyristor-like switching devices appears as a practical choice to provide the harmonic current replicas for injection into the AC phases. Also, it is known in the art to generate three-phase AC currents of any desired frequency from a DC current source by means of a 6-pulse converter and a bank of capacitors for commutation of the switching elements of the converter. Such a device, known as a Graetz bridge converter, is illustrated in FIG. 1, and may be used to provide the required currents for injection into the AC system.

Figure 1:
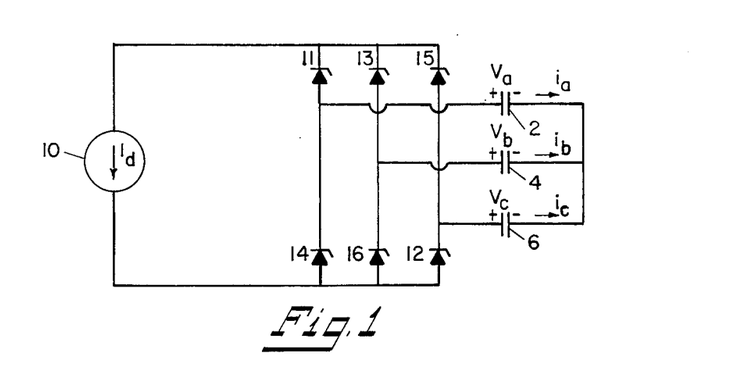
FIG. 1 shows a circuit arrangement for a harmonic converter that may be utilized as a source of injected currents.

The harmonic converter represented in FIG. 1 comprises a souce of variable magnitude direct current $I_d$ 10, and in parallel with the source 10, SCRs 11 to 16 arranged with commutating capacitors 2, 4 and 6 to form a Graetz type converter familiar to those acquainted with power conversion systems. For example, such Graetz type converters are described in our copending application U.S. Ser. No. 623,421, wherein an AC to DC to AC converter is illustrated.

For a general explanation of the operation of the harmonic converter of FIG. 1, the SCRs will be assumed to be ideal and that there is no commutating inductance in series with the capacitors 2, 4 and 6. If initially, the capacitors 2, 4 and 6 are charged so that $V_a$, $V_b$ and $V_c$ are 1.0, and $-1$ p.u. respectively, and if the SCRs 6 and 1 are subsequently given a positive grid pulse with SCRs 11, 12, 13, ... , 16 fired in succession, the voltages given in Table 1 below will appear across the capacitors 2, 4 and 6. (Voltages herein are expressed in per unit terms with a base voltage given by $V_{base} = I_d/6fC$ where C is the value of capacitors 2, 4 or 6. Thus $V_{base}$ is equal to the change in voltage across capacitor 2, 4 or 6 if current $I_d$ of source 10 were to continuously flow through it for 1/6 cycle at a given frequency $f$). Note that the time interval between successive SCR firings correspond to 1/6 of an operation cycle at the operating frequency $f$.

TABLE 1

| SCRs Conducting | Capacitor Voltages at End of Conduction Period | | |
|---|---|---|---|
|  | $V_{a(p.u.)}$ | $V_{b(p.u.)}$ | $V_{c(p.u.)}$ |
| 16, 11 | 0 | 1 | −1 |
| 11, 12 | −1 | 1 | 0 |
| 12, 13 | −1 | 0 | 1 |
| 13, 14 | 0 | −1 | 1 |
| 14, 15 | 1 | −1 | 0 |
| 15, 16 | 1 | 0 | −1 |
| 16, 11 | 0 | 1 | −1 |

Figure 2:
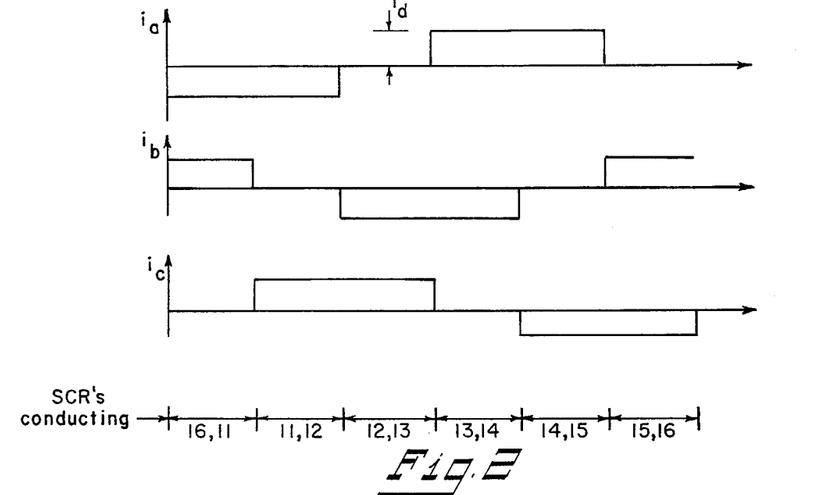
FIG. 2 illustrates the currents produced by the circuit of FIG. 1 to be injected into the various phases of the AC system.

Currents flowing through the capacitors 12, 14 and 16 ($i_a$, $i_b$ and $i_c$ respectively) are shown in FIG. 2 corresponding to the conduction cycles of the SCRs given in Table 1. As will be discussed in greater detail below, the fundamental component of the square-shaped current pulses are injected into the individual phases of the AC system and the remaining harmonics (which are of small magnitude and much higher in frequency compared to the AC system base frequency) are filtered out.

In order to change the magnitude of the harmonic injected currents $i_a$, $i_b$ and $i_c$, the magnitude of the source 10 may be varied. The frequency of currents $i_a$, $i_b$ and $i_c$ may be determined by the frequency or rate of cummutation of the SCRs 11 to 16. The phase of the injected currents may be adjusted by delaying or advancing the firing of the SCRs 11 to 16. Any imbalance in capacitor voltages caused by the process of changing the magnitude, frequency or phase will tend to vanish in steady state due to losses in any real commutation circuit.

The circuit thus described, therefore, enables the generation of three phase AC currents of any desired frequency from a DC current source by means of a converter commutated by a capacitor bank. While the deionization or turn-off times of the SCRs may establish an upper limit on the frequency of operation, quick turn-off SCRs (i.e. having deionization times on the order of 30 to 40 $\mu$ sec.) make possible the generation of currents up to and including the 13th harmonic (roughly 780 Hz) and possibly higher harmonics as well.

The DC current source 10 providing the variable magnitude direct current for the converter of FIG. 1 may comprise a variable DC voltage source with an inductance in series. This DC source may be an AC/DC converter connected to the power system. The voltage produced by this converter may be controlled to obtain the desired value corresponding to the variable magnitude direct current. This will be described in more detail below when control of the magnitude, phase and frequency of the injected currents will be particularly described.

While a circuit has been shown which is capable of producing the requisite currents for injection into the AC network, it is necessary that such currents be injected into the AC network without imposing the fundamental frequency AC network voltage on the harmonic current source. This invention provides further circuitry to enable the effective injection of the currents produced by the harmonic generator and protect it from the AC fundamental. The requirments for such circuitry will be described first in a general way, and a specific preferred embodiment will then be shown and described.

Figure 3A:
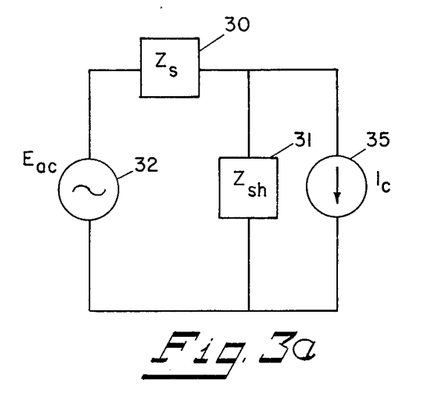
FIG. 3a illustrates a single phase equivalent circuit for prior art passive filters.
Figure 3B:
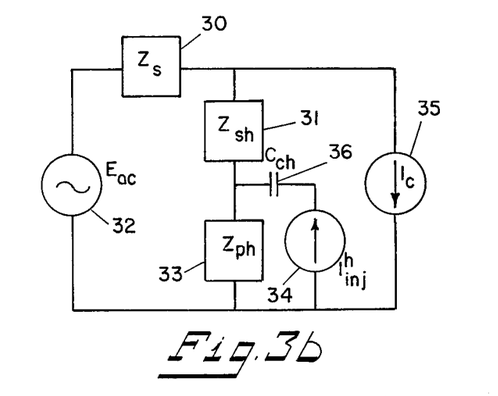
FIG. 3b illustrates a single phase equivalent circuit for the proposed active filter of the invention.

Referring now to FIGS. 3a and 3b, these show equivalent circuits for single phase passive and active filters respectively. In these figures, the AC to DC converter system for conversion of AC to DC power is represented by a current source for AC phase current 35 producing a current $I_c$ which during balanced steady state operation can be expressed as $$I_c = I_c^1 + \Sigma\, I_c^h$$

Here, the superscript h indicates the frequency as a multiple of the system frequency (for normal AC power systems this would be 60 Hz) and $h = 6n + 1$, $n = 1, 2, 3, \ldots$, for a 3 phase, 6 pulse conversion system. For a 3 phase, 12 pulse conversion system, $h = 12n + 1$, $n = 1, 2, 3$, etc.

The equivalent circuits for the prior art passive filters and active filter circuits of the invention are shown respectively in FIGS. 3a and 3b. In these figures the impedances represented as 31 and 33 ($Z_{sh}$ and $Z_{ph}$) are series and shunt tuned filters respectively for currents of h harmonic frequency. The AC system is represented by a Thevenin voltage source 32($E_{ac}$) which for the present discussion is assumed to be of fundamental or base frequency only, that is $E_{ac} = E_{ac}^1$.

Figure 4A:
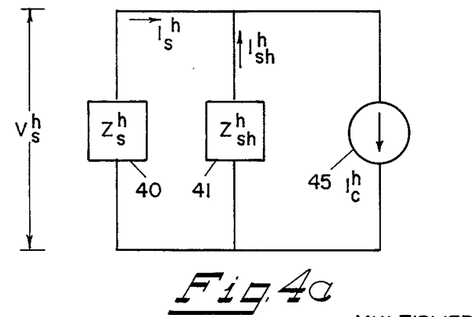
FIG. 4a shows a single phase equivalent circuit for a prior art passive filter at a given harmonic frequency.
Figure 4B:
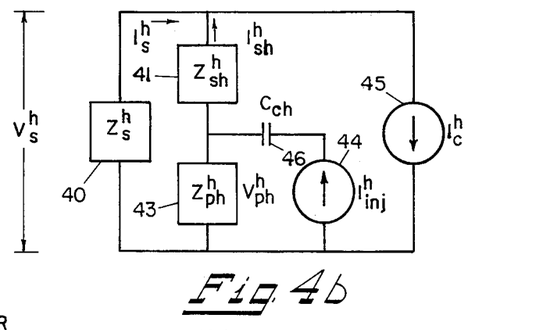
FIG. 4b shows a single phase equivalent circuit for the proposed active filter network of the invention at a given harmonic frequency.

Single phase equivalent circuits at a main characteristic harmonic of the fundamental for the circuits of FIGS. 3a and 3b are shown in FIGS. 4a and 4b respectively. The superscript h denotes the harmonic frequency at which the impedances are calculated.

In the circuit of FIG. 4 impedance 40 ($Z_s^h$) and 41 ($Z_{sh}^h$) represent the impedances 30 ($Z_s$) and 31 ($Z_{sh}$) at the harmonic frequency, the current source 45 $I_c^h$ represents the source 35 ($I_c$) at the harmonic frequency and $V_s^h$ is the voltage appearing across the AC system Thevenin impedance 40.

Referring to FIG. 4a it can be seen that if the system frequency remains at 60 Hz the value of $Z_{sh}^h$ (impedance 40) will be close to zero, since it is tuned to the h harmonic and all the required harmonic current $I_c^h$ (represented as equivalent current source 45) is supplied by the filter and none from the AC system. Therefore the AC system harmonic current represented as $I_s^h$ and the harmonic voltage $V_s^h$ are zero. However, if the system deviates such that the base or fundamental frequency varies from 60 Hz, $Z_s^h$ (40) and $Z_{sh}^h$ (41) in parallel can produce a near resonance condition resulting in high harmonic current and voltage $I_s^h$ and $V_s^h$.

Additionally, for the passive filtration equivalent circuit of FIG. 4a, if the AC system itself were to contain an h harmonic voltage, the low impedance of the tuned filter 41 may act as a sink, inviting the harmonic current from the system to flow through it.

The instant invention teaches a technique for injection of an artifically derived harmonic current such that the value of $I_s^h$ can be brought near zero. Such circuitry is equivalently shown in FIGS. 3b and 4b. Representations of identical elements common to both the filtration schemes of FIGS. 3a and 3b are designated by the same numbers, as in the case for the h harmonic equivalents shown in FIGS. 4a and 4b.

For the circuit of FIG. 4b, for $I_s^h$ and $V_s^h$ to be zero, $I_{sh}^h = I_c^h$.

By provision of parallel resonant filter 33 in FIG. 3b and 43 in FIG. 4b, with injection current sources 34 and 44 as shown, as injected current having the value $$I_{inj}^h = \left[\frac{Z_{sh}^h + Z_{ph}^h}{Z_{ph}^h}\right] \times I_c^h$$

will cause $V_{ph}^h$, the voltage across the parallel-tuned filter to be given as $V_{ph}^h = Z_{sh}^h \cdot I_c^h$.

If filtration were to be ideal it is desirable to have $Z_{sh}^1 = \infty$ and $Z_{ph}^1 = 0$ i.e. that at the fundamental frequency, all the fundamental voltage appears across the series tuned filter 41 and none across the harmonic current source, to prevent imposition of this voltage on the harmonic current source. Also for ideal filtration $Z_{sh}^h$ should be 0, that is, $Z_{sh}$ at the harmonic frequency should be nearly a short circuit and $Z_{ph}^h$ should be infinite so that $I_{sh}^h$, the current flowing through $Z_{sh}^h$ at the harmonic frequency is equal to the injected current $I_{inj}^h$ and that $V_{ph}^h$, the voltage across impedance 43, ($Z_{ph}^h$) is also zero. These ideal filtering requirements on $Z_{sh}$ and $Z_{ph}$ may be approached by a series and shunt tuned filter respectively at the harmonic frequency h. Since in practice the tuned filters are of finite non-zero impedance, the injected current must be controlled in magnitude, frequency and phase so that the condition for yielding $V_s^h$ and $I_s^h$ equal to zero is satisfied.

Figure 5:
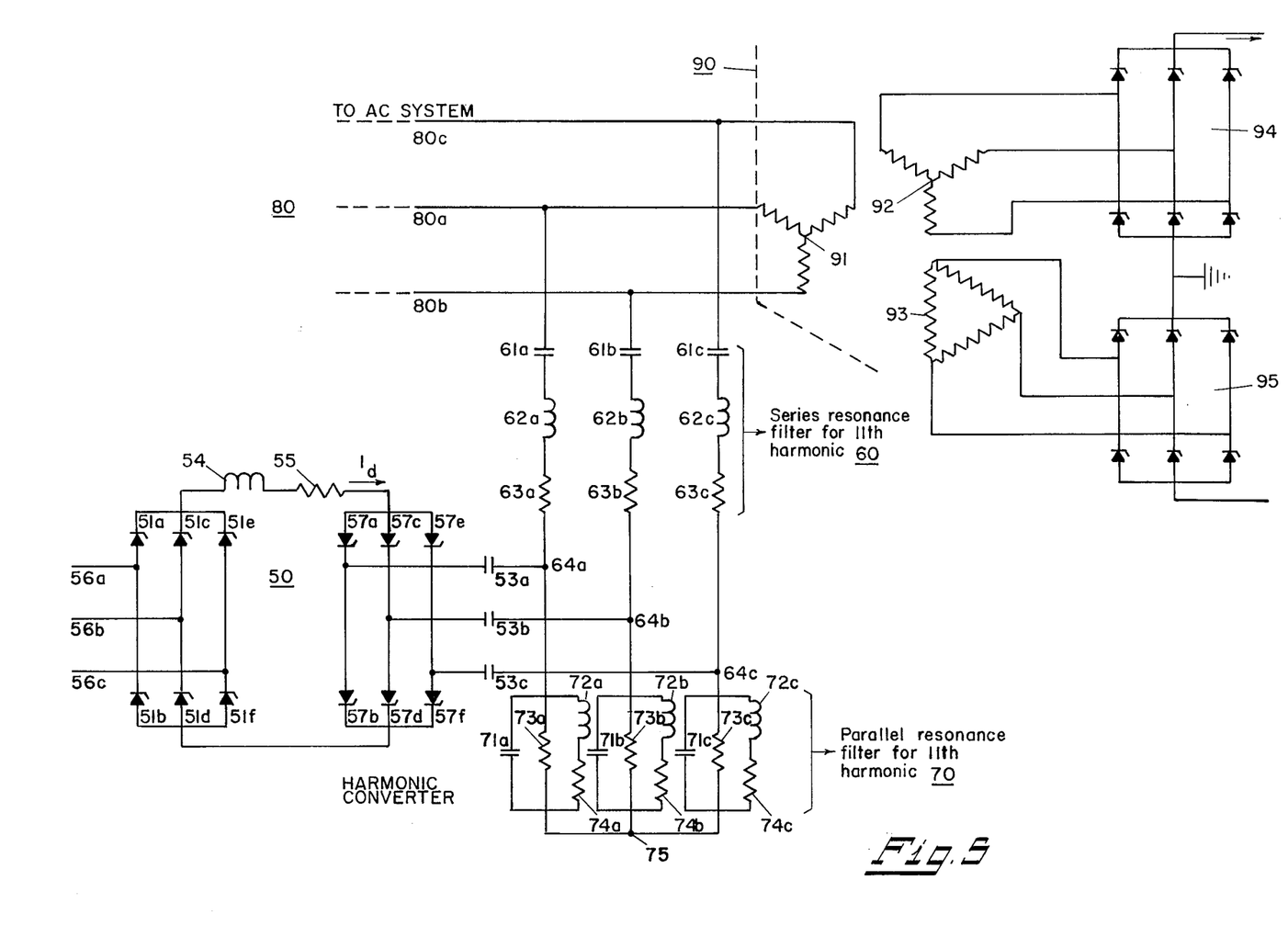
FIG. 5 illustrates the incorporation of active and passive filtration arrangements in an AC to DC power conversion system in accordance with the present invention.

FIG. 5 illustrates the incorporation of an injection source into an AC to DC conversion system and the provision of a parallel-tuned filter used in conjunction with passive series tuned filter. The circuit will be described in detail and appropriate values for circuit elements will be calculated so that the conditions defined above may be approximated.

The circuit of FIG. 5 includes a source of AC power 80, here shown as a 3-phase source (having phases 80a, 80b, and 80c) an AC to DC converter system 90, series resonant passive filter 60, harmonic current source 50 and parallel resonant filter 70. As has been described, the harmonic current source 50 comprises a Graetz bridge type converter wherein an SCR bridge 52 converts DC current supplied by SCR bridge 51 to AC harmonic currents by being commutated by capacitances 53a, 53b and 53c. Bridge 51 receives AC power from the AC power system 80 by means conductors 56a, 56b and 56c. The level of direct current output of the bridge 51, important for the control of the magnitude of the injected current, can be controlled by varying the conduction of the SCRs. Inductor 54 is provided for smoothing the current rectified by bridge 51 so that a relatively smooth DC current may be produced. Resistance 55 is the internal resistance of the smoothing inductor 54.

In the bridge 52, the SCRs are arranged in series-connected pairs, one pair for each phase into which current is to be injected. The series SCRs in each pair are connected in the same direction of conduction with the point of connection between the SCRs in each pair being connected to one terminal of one of the commutating capacitors 53a, 53b or 53c. As has been developed, variation of the conduction of the SCRs of bridge 52 can bring about control of frequency and phase of the injected harmonic currents.

Connecting the commutating capacitors to the AC phases 80a, 80b and 80c are series-resonant filters 60, one corresponding to each phase, each of which is composed of a capacitive element 61a, 61b, 61c; an inductive element 62c, 62b, 62c and a resistive element 63a, 63b, 63c. A plurality of parallel resonant filters 70 are also provided, each of which also corresponds to one of the AC phases and each is connected between the connection (64a, 64b or 64c) between a commutating capacitance and its associated series-resonant filter. Each parallel resonant filter comprises a capacitance (71a, 71b, 71c) in parallel with a resistance (73a, 73b, or 73c) and a parallel branch having an inductance (72a, 72b, or 72c) having an internal resistance (represented by 74a, 74b, or 74c in series with its associated inductance). Both the series 60 and parallel 70 resonance filters are tuned to the same frequency corresponding to the particular harmonic to be eliminated in the AC system.

The AC to DC conversion system identified generally at 90 may comprise a star-delta configuration of transformers 91, 92 and 93, the latter two sets of windings 92 and 93 being connected to Graetz bridge converters 94 and 95 respectively.

For calculating the values of the elements comprising series and parallel resonant filters, the idealized conditions developed for the equivalent circuits of FIGS. 3b and 4b at the harmonic frequency will form the basis. For each phase $$I_{inj}^h = \left[ \frac{Z_{sh}^h + Z_{ph}^h}{Z_{ph}^h} \right] \times I_c^h$$

and $V_{ph}^h = Z_{sh}^h \cdot I_c^h$. Also, $Z_{sh}^h = 0$ and $Z_{ph}^h = \infty$.

Thus at the harmonic frequency, the impedance of the series tuned filter should be small while the impedance of the parallel-tuned filter should be very large in comparison to that of the series-tuned filter so that the injected current will nearly equal the harmonic current in the AC network. Under these conditions, the injected current and voltage across the series-tuned filter can be substantially independent of the AC network impedance and avoid resonance between the filter and the AC network impedance (as is the case if only passive filtration is used). Since the injected current is controllable, it should also be possible to eliminate the harmonic current and voltage in the AC system.

It seems desirable, in providing an active filtration arrangement for existing conversion systems, to be able to utilize existing passive filtration arrangements and incorporate them into the active filtering system. Thus, for 11th harmonic (660 Hz) tuning, a typical set of values for the elements of the series-tuned passive filter might be:

Capacitance 61a: 2.66 μF
Inductance 62a: 22 MH
Resistance 63a: 0.5 Ω

Based on an Eigen value analyses for the transient response, a typical set of values for the elements of the parallel-tuned passive filter might be- Capacitance 71a: 11.07 μF
Resistance 73a: 25 Ω
Inductance 72a: 5.25 MH
Internal resistance 74a: 0.13 Ω

If the AC power system is assumed to be symmetrical then the element values calculated for one phase may be applied to all.

The value of the commutating capacitor 53a can be determined on the basis that for a frequency excursion in the range for which the filter is designed, the total impedance seen by the injected harmonic current flowing through the coupling capacitor 53a is always capacitive. The reactance of the commutating capacitor, therefore might be chosen to be roughly twice the maximum inductive value of the input impedance of the source 50.

Of course to produce a harmonic current for injection of the type described above it is necessary to detect the phase, frequency and magnitude of the 11th harmonic so that an injected current is produced by the source 50 such that the sum of the latter current with the former is substantially zero. FIGS. 6 to 9 accompanying the following description, illustrate examples of the requisite control systems.

Figure 6:
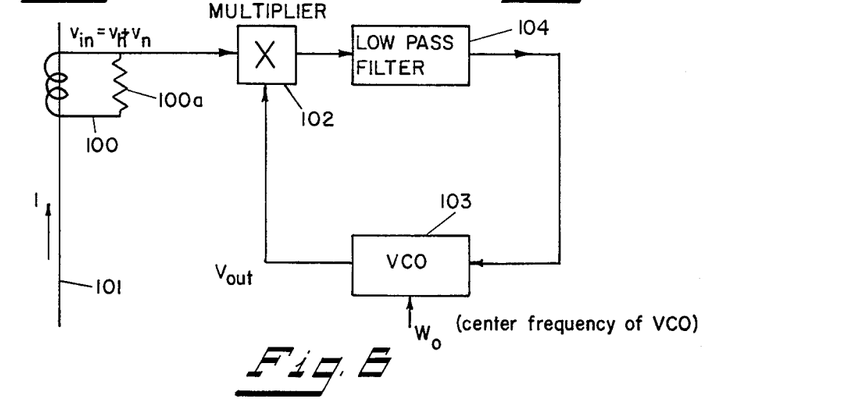
FIG. 6 illustrates a circut for determining the frequency and phase of the harmonic current to be filtered, as well as the current being injected.

A basic means of sensing frequency, phase and magnitude of both the harmonic current in the AC system and the injected current is the phase lock loop (PLL). This circuit is well described in texts[1] and in the literature[2,3] and is illustrated in FIG. 6 and is shown comprising a current sensor 100 for sensing the current of line 101 (which may be one phase of the AC power system). The PLL comprises a voltage multiplier 102 which receives the voltage $V_{in}$ produced by the current sensor 100, as well as the output of a voltage controlled oscillator 103 which, by means of a low pass filter 104, receives the output of voltage multiplier 102.

[1] Gardner, F. M. *Phaselock Techniques,* New York: Wiley, 1966.
[2] A. B. Grebene, "The Monolithic Phase-locked Loop — A Versatile Building Block," *IEEE Spectrum, March 1971.*
[3] H. R. Camenzind and A. B. Grebene, "Phase Locking: Integrated Tuned Circuits Made Easy," *Electronics,* Apr. 28, 1969.

The circuit of FIG. 6 produces a signal $V_{out}$ from the VCO in phase and frequency synchronism with the input $V_{in}$ in the following way. Since the voltage input $V_{in} = V_h$ (the harmonic voltage in line 101) plus $V_n$, (a noise voltage of frequencies other than that of voltage $V_h$), the low pass filter 104 may be tuned to pass a range of frequency from DC to slightly above the expected harmonic excursion. The voltage multiplier produces, as is well known, signals of a frequencies that are the sum and difference of the frequencies of two input signals. The low pass filter will route the average value of the multiplier output to the VCO input. The VCO will either increase or decrease in frequency and phase until a signal of the same frequency and 90° out of phase as that of the measured harmonic is produced. The output of the VCO is a square wave, in phase lock and frequency lock with the measured harmonic. This signal may thus be used to control the firing of the switching elements 52a to 52f of FIG. 5 that produce the injected currents, and thus the phase and frequency of the injected currents may be controlled to match the phase and frequency of the measured harmonics.

Figure 7:
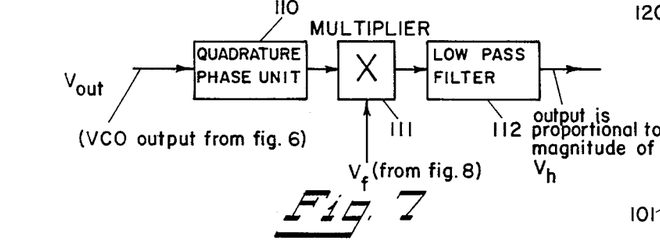
FIG. 7 shows a circuit for detection of the magnitude of the harmonic current to be filtered, as well as the current being injected.

In addition to measuring the phase and frequency, it is necessary to determine the magnitude of the harmonic current present in the AC system for control of the injected currents. FIG. 7 shows a circuit for detecting this quality. The harmonic magnitude detection circuit comprises a quadrature phase shift unit 110 which shifts the output signal of VCO 103 of FIG. 6 by 90°, a voltage multiplier 111 which multiples the VCO output (shifted by 90°) with a signal derived by the circuit of FIG. 8 that contains the 11, 13, 23, 25, . . . etc. harmonics present in the line 101 but will not contain any portion (or having only a negligible amount of) the fundamental. The low pass filter 112 is tuned to pass frequencies lower than the 2nd harmonic of the fundamental and has an output proportional to the magnitude of the harmonic voltage. Because the output of VCO 103 will be a square wave having a base frequency that is the 11th harmonic of the AC system fundamental frequency and also contains several upper harmonics of the AC fundamental frequency (e.g. 33rd), the output of the multiplier 111 will be voltage signals of 0, 2, 22, 24, . . . etc. harmonic of the AC fundamental, that is, having frequencies corresponding to the sum and difference of the multiplier input frequencies. If the low-pass filter 112 is tuned to pass only the frequencies below the 2nd harmonic of the AC fundamental frequency, the output of the low pass filter 112 will be a DC voltage whose magnitude is proportional to the magnitude of the 11th harmonic of the fundamental in line 101.

Figure 8:
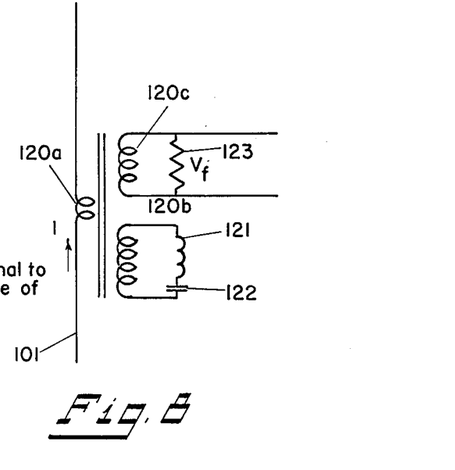
FIG. 8 shows a filter arrangement for preventing the fundamental frequency voltage from affecting the measurement of the harmonic voltage magnitude by the circuit of FIG. 7.

To obtain the signal indicative of the harmonics present in line 101 without the fundamental voltage present, the filtration circuit of FIG. 8 is used. It comprises a three winding transformer 120 having a primary winding 120a connected in one AC phase and secondary winding 120b, having an inductance 121 and a capacitance 122 connected in series across the secondary 120b. The values of the inductance 121 and the capacitance 122 are selected such that, taking into account the leakage inductance of the secondary 120b, the secondary circuit is tuned at the AC fundamental frequency. Also provided is a tertiary circuit comprising tertiary winding 120c of the transformer 120 with a resistance 123 connected across it. The voltage appearing across resistance 123 is the signal indicative of the harmonics present in line 101 without the fundamental, which is filtered by the secondary circuit. This signal $V_f$ is applied to voltage multiplier 111 of FIG. 7.

Figure 9:
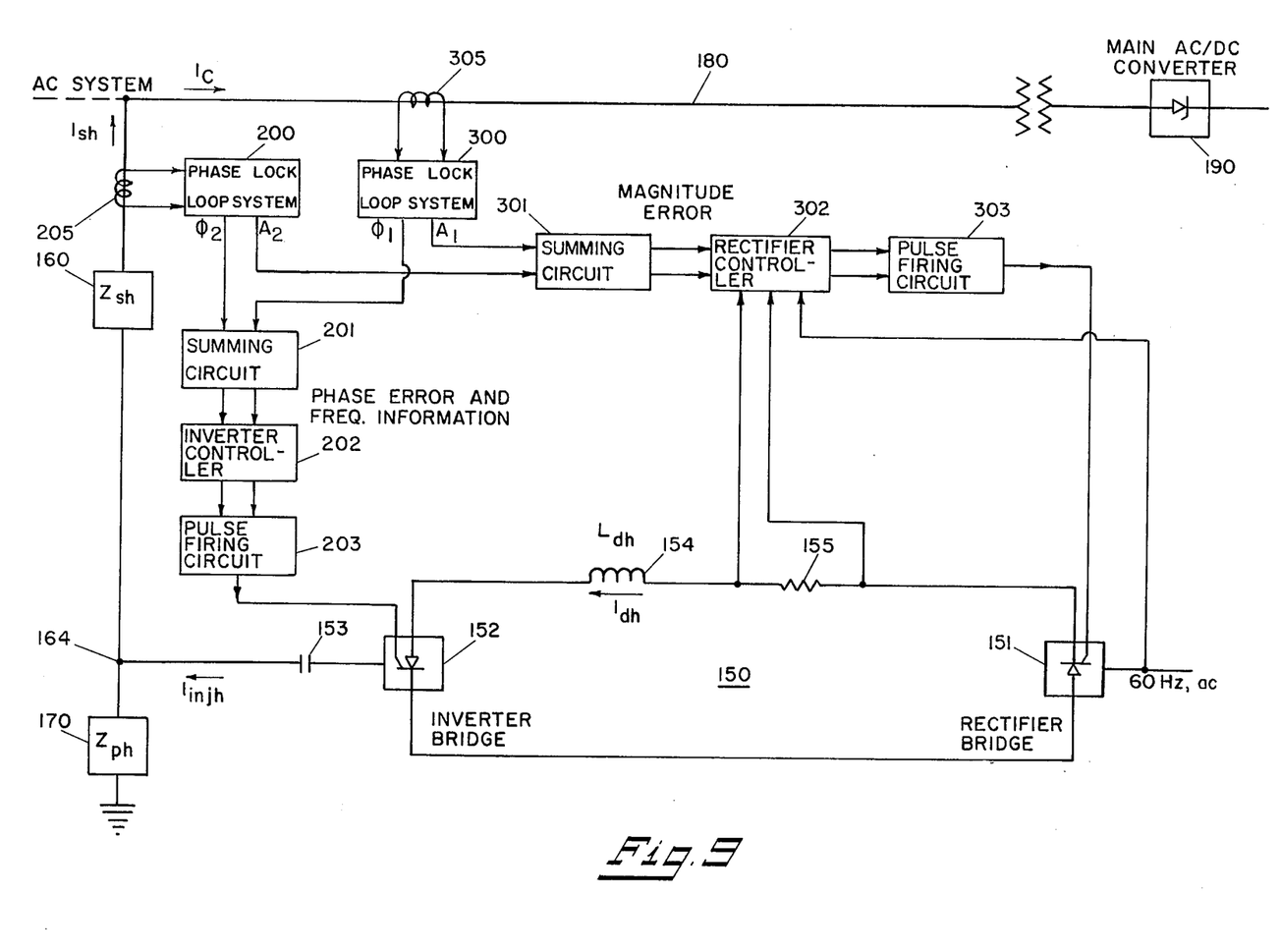
FIG. 9 shows a single phase diagram of the system of FIG. 5 including the provision of circuits for controlling the source of injected currents illustrated in FIGS. 6, 7 and 8.

FIG. 9 illustrates a control system for controlling the injected current for one of the phases. In FIG. 9, an AC phase 180 feeds a AC/DC main converter 190. Injected current for phase 180 is produced by source 150 of the type described above, and these are injected by way of a filter scheme of the type that has been developed, that is, having a parallel-resonant circuit 170 and a series-resonant circuit 160 where the injected currents are introduced at the connection point 164 between the filters 160 and 170. The source 150 comprises a rectifier bridge 151 of SCRs as in FIG. 5 which converst 60 Hz AC to a DC current $I_{dh}$. Inverter 152 produces the injected harmonic currents from the DC current $I_{dh}$ in the manner described for FIG. 5 and injects them via commutation capacitance 153.

To determine the phase, frequency and magnitude of the AC network harmonics and the injected currents, two phase lock loop systems 200 and 300 are provided. Each of these represent the combined circuitry of FIGS. 6, 7 and 8.

Phase lock system 300, by means of current probe 305, senses the harmonic current of the AC phase 180 in the manner described for FIG. 9, and, since loop 300 incorporates the circuitry described in FIGS. 6, 7, and 8, it produces output signal $O_1$ and $A_1$ which are the output of the VCO of the loop and the output of the harmonic voltage magnitude detection circuit respectively of system 300.

In a similar manner, phase lock loop system 200 produces similar signals $O_2$ and $A_2$ for the injected harmonic current sensed by sensor 205.

To control the frequency and phase of the injected currents ($I_{inj}$), control of the switching of the various SCRs of bridge 152 is obtained by summing the phase and frequency information signals $O_1$ and $O_2$ of the phase lock loop system 300 and 200 in a summing circuit 201 that produces a phase error and frequency information signal that is the sum of $O_1$ and $O_2$ the VCO outputs. This signal is fed to an inverter controller 202 which, in response to the level of the voltage output of the summing circuit 201 delays or advances the timing of pulses produced by a pulse firing circuit 203 that are applied to the gates of the SCRs of bridge 152. These latter two circuits can comprise a voltage controlled oscillator and ring counter and have been described in the literature for such purposes (see *IEEE Transactions on Power Apparatus and Systems*, Vol. PAS-87, No. 3, March 1968, "The Phase-locked Osicllator —A new Control System for Controlled Static Convertors" by J. D. Ainsworth).

In a like fashion, the magnitude of the DC current ($I_{dh}$) produced by rectifier bridge 151 is controlled in response to the magnitude of the harmonic signal by means of a summing circuit 301 which adds the two magnitude signals $A_2$ and $A_1$, the sum being applied to a rectifier controller 302 and pulse firing circuit 303 that are similar to the circuits 202 and 203. The operation of rectifier control of this type is also well-illustrated in the literature (see *IEEE Transactions on Power Apparatus and Systems*, Vol. PAS-80, No. 516, May/June 1970, "A Refined HVDC Control System" by A. Ekstrom and G. Liss). It should be mentioned that the ring counters utilized for the firing circuits are of 6 count for the 3-phase circuitry of FIG. 5 and of course will be 2n count for any n-phase system.

Rectifier controller 302 monitors the current $I_{dh}$ in the source 150 by means of resistance 155 that provides a voltage indicative of the current $I_{dh}$. Controller 302 also monitors the 60 Hz AC line voltage to produce logic signals which are fed to the pulse firing circuit 303. The controller 302 varies the delay or advance of firing the SCRs in the bridge 151 to vary the average DC voltage produced by the bridge 151 which in turn vary the DC current $I_{dh}$.

It may not be strictly necessary to monitor and control the injected current for every phase of the system; if it can be safely assumed that the system is symmetrical, only one phase need be monitored to provide for control of all phases as is the case of the control system illustrated in FIG. 9.

While a preferred embodiment of the invention has been shown and described, the invention is not to be construed as being confined to the particular form herein illustrated, but embraces all such modifications and equivalents recognized in the art which may come within the scope of the appended claims.

We claim:
1. A filtering network for suppression of currents having a frequency that is a given harmonic of a base frequency of a multiphase alternating current power source, said filtering network comprising:
  a. a passive resonance filter network for each phase of said alternating current power source tuned at a fixed frequency value corresponding to said given harmonic frequency of said base frequency; and
  b. means associated with said passive filter for injection into each phase of said multiphase alternating current power source an injected current of such magnitude, phase and frequency that the sum of the harmonic current in each phase and the injected current are substantially zero, said means including a harmonic converter having a source of variable magnitude unidirectional current and commutated switching elements for producing said injected harmonic currents by converting the unidirectional current from said source into a plurality of alternating currents each being injected into one of said phases and having a frequency determined by the rate of commutation of said switching elements, a phase as determined by the delay or advance of the commutation of said switching elements and a magnitude determined by the value of the magnitude of current produced by said variable magnitude unidirectional current source.

2. The network of claim 1 wherein each said passive filter provides a current path between one phase of said multiphase alternating current power source and said means for injection said injected currents, and including a parallel-resonance filter tuned to said given harmonic frequency for each phase being connected between the point of connection of said passive filter for the respective phase with said means for injecting said injected currents and a point common to all said parallel filters.

3. The netowrk of claim 10 wherein said harmonic converter comprises a source of variable-magnitude direct current, a series-connected pair of switching elements of each phase of said alternating current power source in parallel with said source of direct current and a commutation capacitor connecting the point of connection between the switching elements of each said pair to the point of connection between each parallel filter and passive filter network for each phase of said multiphase alternating current power source.

4. The network of claim 5 wherein said switching elements are silicon controlled rectifiers, said rectifiers in each said pair being connected in series in the same direction of conduction.

5. The filter network of claim 10 including means responsive to the phase and frequency of the harmonic and injected currents for controlling the conduction of said switching elements comprising:
means for deriving a signal indicative of the phase and frequency of the harmonic current to be filtered in one phase of said multiphase alternating current power source,
means for deriving a signal indicative of the phase and frequency of the current injected into said one phase of said multiphase alternating current power source,
means for comparing the derived phase and frequency signals of said harmonic and injected currents and deriving a control signal indicative of the difference between the derived phase and frequency signals and
means or delaying or advancing the conduction of said switching elements in response to the magnitude of said difference signal.

6. The network of claim 7 including means responsive to the magnitudes of the injected current and the harmonic current to be filtered for controlling the magnitude of current produced by said current source comprising:
means for determining the magnitude of the harmonic current to be filtered in one phase of said multiphase alternating current power system,
means for determining the magnitude of the current injected into one phase of said alternating current power system,
means for deriving a magnitude difference signal indicative of the difference between the magnitude of the current injected into
one phase of said multiphase alternating current power system and the magnitude of the harmonic current to be filtered in one phase of said alternating current power system, and
means for varying the magnitude of the direct current produced by said unidirectional current source in response to the magnitude of said magnitude difference signal.

7. The network of claim 8 wherein said unidirectional current source comprises a full-wave rectifier bridge each leg thereof containing a silicon controlled rectifier and wherein means are provided to vary the delay or advance of conduction of said silicon controlled rectifiers in response to the magnitude of said magnitude difference signal.

8. A filtering network for suppression of currents having a frequency that is a given harmonic of a base frequency of a multiphase alternating current power source, said filtering network including a passive resonance filter network for each phase of said alternating current power source tuned at a fixed frequency value corresponding to said given harmonic frequency of said base frequency and further including an active filter network for each phase of said alternating current power source having means for injection into each phase of said multiphase alternating current power source an injected current of such magnitude, phase and frequency that the sum of the harmonic current in each said phase and the injected current are substantially zero, and wherein each said passive filter provides a current path between one phase of said multiphase alternating current power source and said means for injection said injected current, and including a parallel-resonance filter tuned to said given harmonic frequency for each phase being connected between the point of connection of said passive filter for the respective phase with said means for injecting said injected currents and a point common to all said parallel filters.

9. A filtering network for suppression of currents having a frequency that is a given harmonic of a base frequency of a multiphase alternating current power source, said filtering network including a passive resonance filter network for each phase of said alternating current power source tuned at a fixed frequency value corresponding to said given harmonic frequency of said base frequency and a parallel-resonance filter tuned to said given harmonic frequency, said network further including an active filter network for each phase of said alternating current power source having means for injection into each phase of said multiphase alternating current power source an injected current of such magnitude, phase and frequency that the sum of the harmonic current in each phase and the injected current are substantially zero, wherein said means for injecting said injected currents comprises a harmonic converter having a source of variable magnitude direct current and commutated switching elements for producing said injected harmonic current by converting said source of variable magnitude unidirectional current into a plurality of alternating currents each being injected into one of said phases and having a frequency determined by the rate of commutation of said switching elements, a phase as determined by the delay or advance of the commutation of said switching elements and a magnitude determined by the value of the magnitude of current produced by said variable magnitude unidirectional current source, wherein said harmonic converter switching elements comprises a series connected pair of switching elements for each phase of said alternating current power source in parallel with said source of direct current and said harmonic converter further includes a commutation capacitor connecting the point of connection between the switching elements of each said pair to the point of connection between each parallel filter and passive filter network for each phase of said multiphase alternating current power source.

10. The network of claim 9 wherein said switching elements are silicon controlled rectifiers, said rectifiers in each said pair being connected in series in the same direction of conduction.

11. A filtering network for suppression of currents having a frequency that is a given harmonic of a base frequency of a multiphase alternating current power source, said filtering network including a passive resonance filter network for each phase of said alternating current power source tuned at a fixed frequency value corresponding to said given harmonic frequency of said base frequency and a parallel resonance filter tuned to said given harmonic frequency, said network further including an active filter network for each phase of said alternating current power source having means for injection into each phase of said multiphase alternating current power source an injected current of such magnitude, phase and frequency that the sum of the harmonic current in each said phase and the injected current are substantially zero, and wherein said means for injecting said injected currents comprises a harmonic converter having commutated switching elements for producing said injected harmonic currents by converting a source of variable magnitude unidirectional current into a plurality of alternating currents each being injected into one of said phases and having a frequency determined by the rate of commutation of said switching elements, a phase as determined by the delay or advance of the commutation of said switching elements and a magnitude determined by the value of the magnitude of current produced by said variable magnitude unidirectional current source, and further including means responsive to the phase and frequency of the harmonic and injected currents for controlling the conduction of said switching elements comprising,
  means for deriving a signal indicative of the phase and frequency of the harmonic current to be filtered in one phase of said multiphase alternating current power source,
  means for deriving a signal indicative of the phase and frequency of the current injected into said one phase of said multiphase alternating current power source,
  means for comparing the derived phase and frequency signals of said harmonic and injected currents and driving a control signal indicative of the difference between the derived phase and frequency signals, and
  means for delaying or advancing the conduction of said switching elements in response to the magnitude of said difference signal.

12. The network of claim 11 including means responsive to the magnitudes of the injected current and the harmonic current to be filtered for controlling the magnitude of current produced by said current source comprising:
  means for determining the magnitude of the harmonic current to be filtered in one phase of said multiphase alternating current power system,
  means for determining the magnitude of the current injected into one phase of said alternating current power system,
  means for deriving a magnitude difference signal indicative of the difference between the magnitude of the current injected into one phase of said multiphase alternating current power system and the magnitude of the harmonic current to be filtered in one phase of said alternating current power system, and
  means for carrying the magnitude of the direct current produced by said unidirectional current source in response to the magnitude of said magnitude difference signal.

13. The network of claim 12 wherein said unidirectional current source comprises a full-wave rectifier bridge each leg thereof containing a silicon controlled rectifier and wherein means are provided to vary the delay or advance of conduction of said silicon controlled rectifiers in response to the magnitude of said magnitude difference signal.

* * * * *